(12) United States Patent
Yokoyama

(10) Patent No.: US 7,538,936 B2
(45) Date of Patent: May 26, 2009

(54) PULSE LASER BEAM GENERATING DEVICE

(75) Inventor: Hiroyuki Yokoyama, Sendai (JP)

(73) Assignee: Tohoku Techno Arch Co., Ltd. (JP)

( * ) Notice: Subject to any disclaimer, the term of this patent is extended or adjusted under 35 U.S.C. 154(b) by 54 days.

(21) Appl. No.: 11/571,420

(22) PCT Filed: Jun. 30, 2005

(86) PCT No.: PCT/JP2005/012031

§ 371 (c)(1),
(2), (4) Date: Dec. 28, 2006

(87) PCT Pub. No.: WO2006/003969

PCT Pub. Date: Jan. 12, 2006

(65) Prior Publication Data

US 2008/0037108 A1 Feb. 14, 2008

(30) Foreign Application Priority Data

Jul. 6, 2004 (JP) ............................ 2004-199277

(51) Int. Cl.
G02F 1/35 (2006.01)
G02F 2/02 (2006.01)
(52) U.S. Cl. .................... 359/328; 359/326; 359/341.1; 359/341.3; 372/22
(58) Field of Classification Search ......... 359/326–332, 359/341.1, 341.3; 372/21, 22
See application file for complete search history.

(56) References Cited

U.S. PATENT DOCUMENTS 6,014,249 A * 1/2000 Fermann et al. .......... 359/341.1

6,961,170 B2 * 11/2005 Hubbard .................. 359/330

FOREIGN PATENT DOCUMENTS

EP 1 118 904 7/2001

(Continued)

OTHER PUBLICATIONS

Morioka, et al., "Transform-limited, femtosecond WDM pulse generation by spectral filtering of gigahertz supercontinuum," Electronic Letters, Jul. 7, 1994, vol. 30, No. 14, pp. 1166-1168.

(Continued)

Primary Examiner—Sung H Pak
Assistant Examiner—Daniel Petkovsek
(74) Attorney, Agent, or Firm—Hayes Soloway P.C.

(57) ABSTRACT

To induce a targeted non-linear optical effect by a high-peak-power light by using a light pulse from a semiconductor laser without using a light pulse from a large, high-average-power solid laser such as titanium sapphire laser. A semiconductor laser pulse beam with a wavelength of 1550 nm (for example, repeatability of 1 MHz) from a semiconductor laser (laser diode: LD) is efficiently amplified in two stages, front-end and main EDFAs. An optical filter removes a spontaneous emission light component that is noise. An optical filter picks up, from the amplified pulse beam, second harmonic light pulse produced by the non-linearity of an optical device (frequency polarization inversion Mg-added $LiNbO_3$:PPMgLN) to produce a super-continuum light in a 800 nm wavelength region from a photonic crystal fiber (PCF).

4 Claims, 3 Drawing Sheets

FOREIGN PATENT DOCUMENTS

| | | |
|---|---|---|
| JP | JP 9-160082 | 6/1997 |
| JP | 2004-79876 | 3/2004 |

OTHER PUBLICATIONS

Herrmann et al., "Experimental Evidence for Supercontinuum Generation by Fission of Higher-Order Solitons in Photonic Fibers", Physical Review Letters, Apr. 29, 2002, vol. 88, No. 17, pp. 173901-1-173901-4.

Calvani et al., "Subpicosecond pulses at 2.5GHz from filtered supercontinuum in a fibre pumped by a chirp compensated gain-switched DFB laser", Electronics Letters, vol. 31, No. 19, Sep. 14, 1995.

* cited by examiner

PULSE LASER BEAM GENERATING DEVICE

TECHNICAL FIELD

The present invention relates to the generation of optical supercontinuum pulses and light pulses having high peak power with the aid of a simple structure.

BACKGROUND ART

Currently, optical supercontinuum pulses are used in optical communications, photoelectronic measurements, biophotonics, and a variety of other applications. Due to recent advances in optical fiber technology, mode-locked fiber lasers and semiconductor lasers that have high repetition frequencies in the gigahertz range or above and a central wavelength of 1550 nm can generate supercontinuum light having a peak optical power of several watts (see Non-Patent Document 1). The invention of photonic crystal fiber has made it possible to generate supercontinuum light having moderate peak optical power in an input light wavelength range of 1 µm or less (see Non-Patent Document 2).

Mode-locked titanium-sapphire lasers are used in basic research on supercontinuum light generation. However, a small-scale, low-cost light-pulse source is desired for practical applications.

[Non-Patent Document 1]
T. Morioka et al., "Transform-limited, femtosecond WDM pulse generation by spectral filtering of gigahertz supercontinuum", Electron. Lett. 30,pp 1166-1167 (1994)

[Non-Patent Document 2]
J. Hermann et al., "Experimental evidence for supercontinuum generation by fission of higher-order solitons in phonic fibers", Phys. Rev. Lett. 88, 1739001 (2002)

DISCLOSURE OF THE INVENTION

[Problems to be Solved by the Invention]

It is an object of the present invention to induce targeted nonlinear optical effects by high-peak power light through the use of light pulses from a semiconductor laser, but without the use of light pulses from a titanium-sapphire laser or other large-scale solid-state laser having high mean power.

[Means for Solving the Above-Mentioned Problems]

In order to achieve the above object, the present invention provides a pulse laser beam generating device for generating light pulses having high peak power, characterized in comprising a semiconductor laser that has an average light output power unobscured by ASE noise after pre-amplification, and that generates light pulses having a high repetition rate in a bandwidth broadened by frequency chirping; a pre-optical amplifier that is based on an optical fiber and amplifies the light pulses from the semiconductor laser; a filter whereby the light pulses amplified by the pre-optical amplifier are extracted in a band narrower than the width widened by the frequency chirping of the semiconductor laser, and the time interval of the light pulses is reduced; and a main optical amplifier that receives the light pulses from the filter and is based on an optical fiber having low nonlinear effects and minimal distortion in the optical spectrum due to self-phase modulation.

An erbium-doped fiber amplifier (EDFA) or other optical amplifier based on an optical fiber is used to enable short pulses of light having a low average optical power to be efficiently amplified as pulsed light having high peak power. This is achieved by using a filter for filtering light pulses emitted by a semiconductor laser at a high repetition rate, extracting the pulses from the optical spectrum in a band narrower than a width broadened by the frequency chirping of the semiconductor laser, and reducing the time interval of the light pulses.

The present invention also provides a pulse laser beam generating device characterized in comprising a semiconductor laser that has an average light output power unobscured by ASE noise after pre-amplification, and that generates light pulses having a high repetition rate in a bandwidth broadened by frequency chirping; a pre-optical amplifier that is based on an optical fiber and amplifies the light pulses from the semiconductor laser; a filter whereby the light pulses amplified by the pre-optical amplifier are extracted in a band narrower than the width widened by the frequency chirping of the semiconductor laser, and the time interval of the light pulses is reduced; a main optical amplifier that receives the light pulses from the filter and is based on an optical fiber having low nonlinear effects and minimal distortion in the optical spectrum due to self-phase modulation; and a nonlinear optical device for generating supercontinuum light by using light pulses of high peak power sufficiently amplified by the main optical amplifier.

The present invention also provides a pulsed laser light generating device characterized in comprising a semiconductor laser that has an average light output power unobscured by ASE noise after pre-amplifier, and that generates light pulses having a high repetition rate in a bandwidth broadened by frequency chirping; a pre-optical amplifier that is based on an optical fiber and amplifies the light pulses from the semiconductor laser; a filter whereby the light pulses amplified by the pre-optical amplifier are extracted in a band narrower than the width widened by the frequency chirping of the semiconductor laser, and the temporal width of the light pulses is reduced; a main optical amplifier that receives the light pulses from the filter and is based on an optical fiber having low nonlinear effects and minimal distortion in the optical spectrum due to self-phase modulation; a frequency-converting optical device for obtaining second-harmonic light pulses by using light pulses of high peak power sufficiently amplified by the main optical amplifier; and a nonlinear optical device for generating supercontinuum light using the light pulses from the frequency-converting optical device.

Effects of the Invention

The above configuration enables, e.g., a small-scale, low-cost light-pulse source to be provided for biomedical and other applications.

BEST MODE FOR CARRYING OUT THE INVENTION

Figure 1:
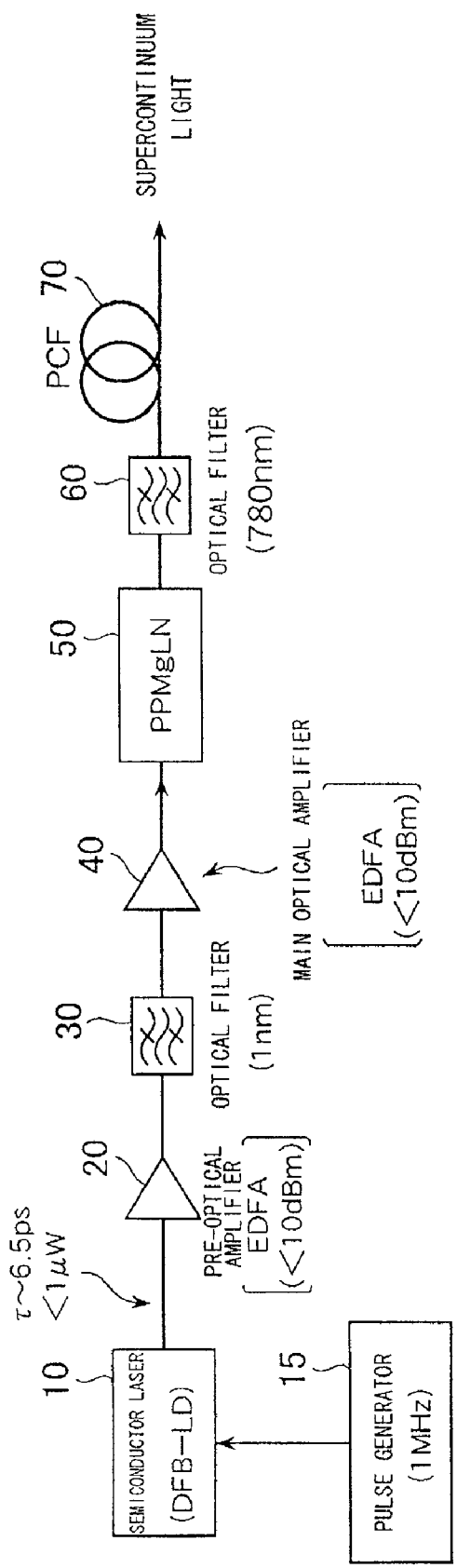
FIG. 1 is a diagram showing the configuration of an apparatus for generating a pulsed laser beam according to an example.

The present invention is configured to generate peak-power light with which supercontinuum light can be generated by nonlinear optical effects, e.g., by amplifying light pulses from a semiconductor laser with the aid of an optical amplifier that uses an optical fiber.

The lifespan of population inversion in an erbium-doped fiber amplifier (EDFA) or another amplifier that uses an optical fiber for amplification is in the range of milliseconds. Therefore, energy stored within an EDFA is efficiently transferred to amplified pulsed light having a repetition rate of 1 kHz or more. This characteristic is quite different from the population inversion lifespan of less than ten nanoseconds in semiconductor laser amplifiers. Therefore, if an EDFA is used, short pulses of light can be amplified to a very large peak power by properly selecting the repetition rate of the light pulses.

However, the amplified spontaneous emission (ASE) noise within the optical amplifier must be considered. Generally speaking, an optical signal input power of 1 µW or more is necessary in order to prevent the pulses from being obscured by post-amplification ASE noise. The energy of one light pulse from a laser diode (LD) is approximately 1 pJ. Therefore, an average optical power of 1 µW can be expected at a high repetition rate, e.g., at a rate of about 1 MHz.

Another important limit is set by third-order nonlinear optical effects induced in the EDFA. If a conventional EDFA is used to amplify light pulses, distortion can be observed in the frequency range due to self-phase modulation (SPM) having a peak power of 100 W or more. This effect is due to the light pulses propagating several meters or several tens of meters in the fiber within an EDFA having an optical power density of $10^7$ W/cm$^2$ or more. EDFAs with large core diameters and short fiber lengths are useful for avoiding distortion in the frequency range due to unintended SPM.

Controlling ASE and SPM makes it possible to obtain light pulses having kilowatt-order peak power and an average optical output power of several milliwatts.

A frequency that is too low thus becomes the primary limiting factor in regard to any obscuring noise that arises during the amplification process. If the frequency is too high, an optical amplifier with a high mean power is necessary to adequately increase the post-amplification peak power. Therefore, in practice, a repetition rate of 100 kHz to 10 MHz should be selected for the light pulses.

It is thereby possible to provide a compact light-pulse source that has adequate peak power for generating supercontinuum light converted to the second harmonic and supercontinuum light in the 800 nm range.

Therefore, in the present invention, two-stage amplification is carried out using optical fiber in a pre-optical amplifier and a main optical amplifier to amplify light pulses that have a high repetition rate from a semiconductor laser.

In the example below, a semiconductor laser pulse beam that has a wavelength of 1550 nm and is emitted by a semiconductor laser (a gain-switched InGaAsP laser diode (LD)) is efficiently amplified in two stages: a pre-and a main EDFA. Supercontinuum light in the 800 nm wavelength range is generated from a photonic crystal fiber (PCF) using second-harmonic light pulses generated from the amplified pulsed light by the nonlinearity of an optical device.

EXAMPLE

An example configuration is shown in FIG. 1. An InGaAsP distributed-feedback Bragg-structure laser diode (DFB-LD) 10 having gain-switching multi-quantum wells was used, whereby pulsed light having a wavelength of 1550 nm was produced at a rate of 1 MHz or another adequately high repetition rate by electrical pulses from a pulse generator 15. At this level of excitation, light pulses of approximately 10 ps were generated with an average optical power of about 1 µW. With this average optical power, it was possible to prevent situations in which optical noise (spontaneous emission noise) would obscure the light pulses and make it impossible to identify [the pulses] in the optical spectrum during amplification by a pre-optical amplifier 20.

At this point, the optical spectrum of the laser pulses was expanded to about 2 nm or more by the strong excitation of the electrical pulses (this phenomenon is called frequency chirping and has an unnecessarily broad bandwidth).

Taking into account that the object was further amplification to a high peak power, a pulse repetition frequency of less than 1 MHz was good, but a frequency of about 1 MHz was selected in order to prevent optical noise from obscuring the light pulses.

In the present invention, optical amplification by a two-stage EDFA wad carried out as described earlier in order to amplify light pulses generated by a semiconductor laser to an adequately high peak power. In the example, a commercially available EDFA having a low mean power was used as the pre-amplifier 20. The amplified light pulses were filtered using an optical filter 30 having a frequency width of 1 nm. The average optical power output from the pre-optical amplifier 20 was in the sub-milliwatt range, but a spontaneously emitted optical noise component was also included therein. The light pulses were passed through an optical filter having a bandwidth of 1 nm in order to remove the noise component and to extract the light-pulse component from the above-described chopped optical spectrum in a narrower band.

The average optical power after optical filtering was several tens of microwatts. However, the temporal width of the light pulses was about 6 ps, which is approximately half as short as the original length. This was the result of a reduction in the above-described frequency chirping effect. Narrowing the light pulses is useful for obtaining high peak power. The peak power $P_p$ of the light pulses is given by the relationship $P_p = P_{av} \times 1/(f \times \tau)$, where $P_{av}$ is the average optical power, f is the frequency of repetition, and τ is the pulse width.

At this point, it can be estimated that the average optical power is tens of microwatts, and the peak power of the light pulses is several watts.

An EDFA with low nonlinear effects was used as a main optical amplifier 40. The optical amplifier 40 was configured from short optical fiber (fluoride active fiber) doped with a high concentration of erbium ions (for an example of this fiber, see: Y. Kubota et al., Novel Er and Ce co-doped fluoride fiber amplifier for low-noise and high-efficient operation with 980-nm pumping", IEEE Photon. Tech. Lett. 15,pp. 525-527 (2003)). The length of the active fibers was 0.7 m. This amplifier provided a maximum average optical power output of 10 mW for a single 980 nm-LD excitation. Due to the short length of the fibers, unintended SPM was greatly improved as compared with conventional EDFAs. The peak power without significant SPM was estimated to be 1 kW at that stage.

The optical output from the main optical amplifier also needed to be only about 10 mW in terms of mean power, and a small-scale, inexpensive optical amplifier (200,000 to 300,000 Japanese yen) could therefore be used (for these purposes, the cost usually increases by one order of magnitude for an optical amplifier having a high mean power of about 1 W). According to a simplified calculation, the peak optical power $P_p$ reached 1 kW at a pulse width τ of 6 ps, a repetition f of 1 MHz, and an average optical power $P_{av}$ of 6 mW. Nonlinear wavelength conversions and the like can be easily carried out with high efficiency at this peak power.

After the second stage of amplification, the light pulses were converted to the second harmonic (SH) wavelength (780 nm) using a periodic polarization-inverting Mg-doped LiNbO$_3$ (PPMgLN) optical waveguide 50. The SH light pulses were extracted with a 780-nm optical filter 60. In the present example, loss due to optical coupling was large, and the conversion efficiency was therefore limited to a maximum of several percentage points. The result was the generation of SH light pulses having a peak power of 10 W. In this case, the purpose of the frequency conversion was to obtain wavelengths identical to the pulses of a large-scale titanium-sapphire solid-state laser. Second-harmonic light pulses having a time interval of approximately 5 ps impinged on a perforated photonic crystal fiber (PCF) 70 in which zero dispersion occurred over a length of 50 m in the 800-nm wavelength region. In the configuration of this example, the average optical power was 10 mW (10 dBm) or less, and an optical device having a high average power on the order of 1 W was not necessary.

Figure 2:
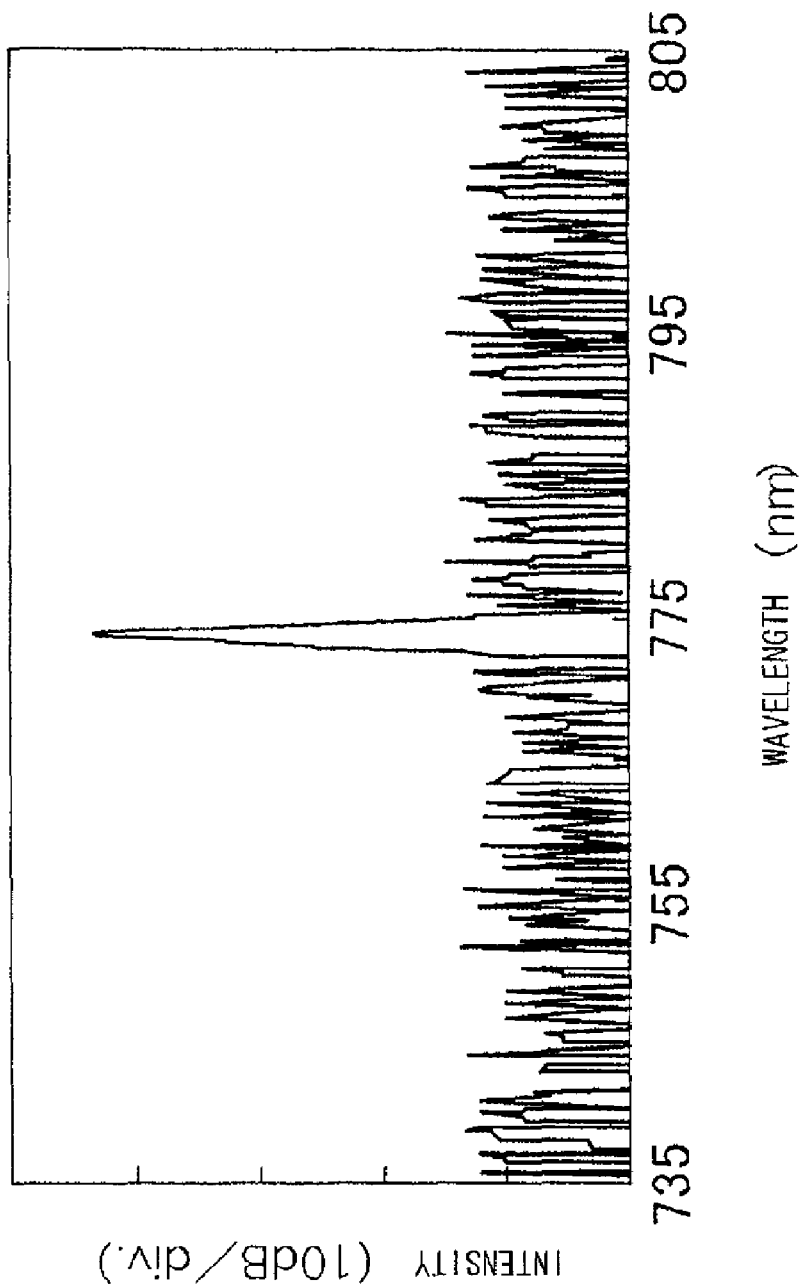
FIG. 2 is a graph showing the second harmonic spectrum of the pulse laser beam generating device of FIG. 1.
Figure 3:
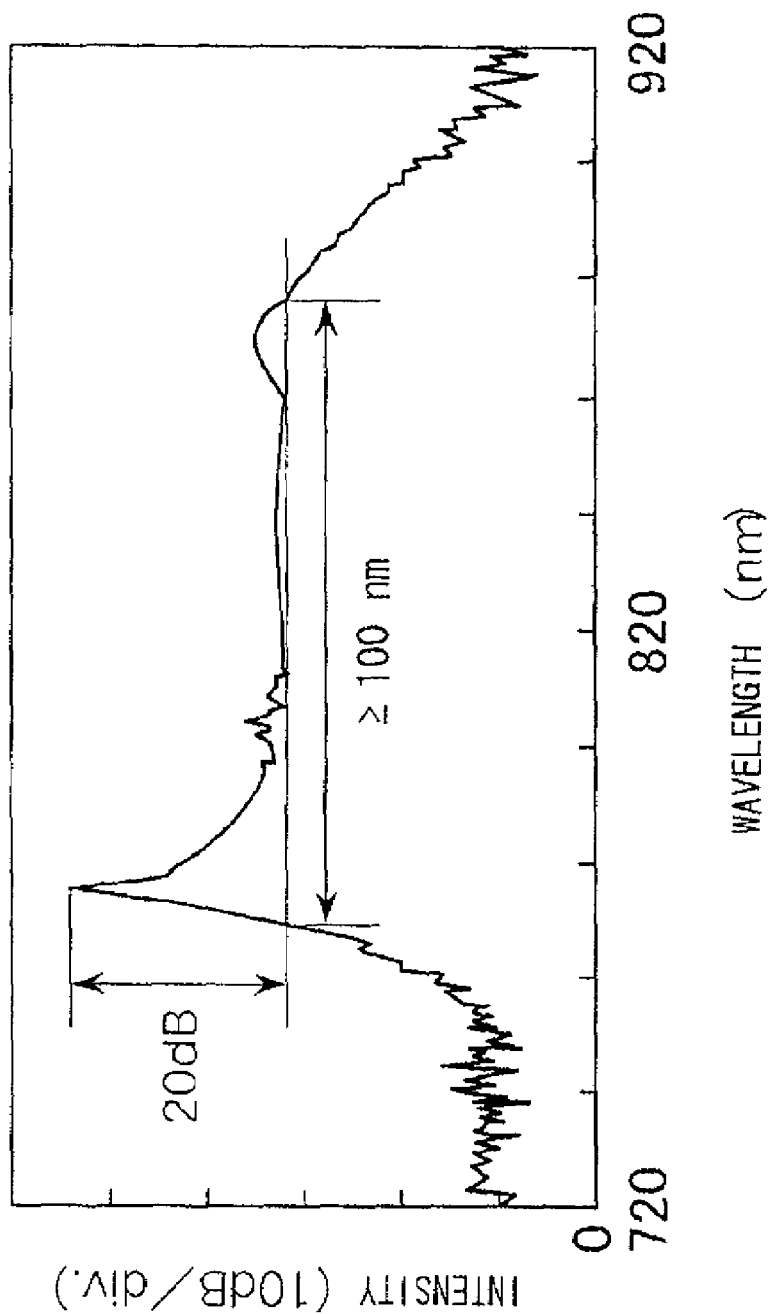
FIG. 3 is a graph showing a logarithmic spectrum of supercontinuum light.

FIG. 2 shows an optical spectrum of the input SH pulses. A broadening of approximately 30 nm was observed at the level of intensity 20 dB below the peak. In this instance, the average optical power was 15 µW. FIG. 3 shows an optical spectrum of supercontinuum light when the peak power of SH pulses was 12 W. The broadening of this spectrum extends to 100 nm or greater.

Such supercontinuum light is usually obtained using a titanium-sapphire solid-state laser. The above-described supercontinuum light having a low average [intensity] will not damage biological tissues and is very useful for biomedical applications.

Moreover, if wavelengths identical to the pulses of a large-scale titanium-sapphire solid-state laser are not necessary, supercontinuum light can be generated by the PCF directly without second harmonic frequency conversion.

The invention claimed is:

1. A pulse laser beam generating device comprising:
   a semiconductor laser that has an average light output power of equal to or more than 1 µW unobstructed by amplified spontaneous emission noise after pre-amplification, and that generates light pulses having a repetition rate of 100 kHz to 10 MHz;
   a pre-optical amplifier that is based on an optical fiber and amplifies the light pulses from said semiconductor laser;
   a filter that extracts the light pulses amplified by said pre-optical amplifier in a band narrower than the width widened by the frequency chirping of said semiconductor laser, and that reduces the time interval of the light pulses;
   a main optical amplifier that receives the light pulses from said filter and is based on an optical fiber having low nonlinear effects and minimal distort ion in the optical spectrum due to self phase modulation; and
   a nonlinear optical device for generating supercontinuum light by using light pulses of high peak power sufficiently amplified by the main optical amplifier.

2. The pulse laser beam generating device of claim 1, wherein the supercontinuum light has a spectrum width of 100 nm or greater.

3. A pulse laser beam generating device comprising:
   a semiconductor laser that has an average light output power of equal to or more than 1 µW unobscured by amplified spontaneous emission noise after pre-amplification, and that generates light pulses having a repetition rate of 100 kHz to 10 MHz;
   a pre-optical amplifier that is based on an optical fiber and amplifies the light pulses from said semiconductor laser;
   a filter that extracts the light pulses amplified by said pre-optical amplifier in a band narrower than the width widened by the frequency chiming of said semiconductor laser, and that reduces the time interval of the light pulses;
   a main optical amplifier that receives the light pulses from said filter and is based on an optical fiber having low nonlinear effects and minimal distortion in the optical spectrum due to self-phase modulation;
   a frequency-converting optical device for obtaining second-harmonic light pulses by using light pulses of high peak power sufficiently amplified by the main optical amplifier; and
   a nonlinear optical device for generating supercontinuum light using the light pulses from said frequency-converting optical device.

4. The pulse laser beam generating device of claim 3, wherein the supercontinuum light has a spectrum width of 100 nm or greater.

* * * * *

UNITED STATES PATENT AND TRADEMARK OFFICE
CERTIFICATE OF CORRECTION

| | |
|---|---|
| PATENT NO. | : 7,538,936 B2 |
| APPLICATION NO. | : 11/571420 |
| DATED | : May 26, 2009 |
| INVENTOR(S) | : Yokoyama |

It is certified that error appears in the above-identified patent and that said Letters Patent is hereby corrected as shown below:

Claim 3, Col. 6, line 24, "frequency chiming of" should be --frequency chirping of--.

Signed and Sealed this

Twenty-fifth Day of August, 2009

David J. Kappos
*Director of the United States Patent and Trademark Office*